United States Patent
Kube (10) Patent No.: US 10,118,181 B2
(45) Date of Patent: Nov. 6, 2018

(54) DRIVE CONTROL METHOD AND DRIVE SYSTEM OPERATING ACCORDING TO SAID METHOD

(71) Applicant: SIEMENS AKTIENGESELLSCHAFT, München (DE)

(72) Inventor: Andreas Kube, Aachen (DE)

(73) Assignee: Siemens Aktiengesellschaft, München (DE)

( * ) Notice: Subject to any disclaimer, the term of this patent is extended or adjusted under 35 U.S.C. 154(b) by 547 days.

(21) Appl. No.: 14/761,203

(22) PCT Filed: Aug. 6, 2013

(86) PCT No.: PCT/EP2013/066483
§ 371 (c)(1),
(2) Date: Jul. 15, 2015

(87) PCT Pub. No.: WO2014/111176
PCT Pub. Date: Jul. 24, 2014

(65) Prior Publication Data
US 2015/0336107 A1    Nov. 26, 2015

(30) Foreign Application Priority Data
Jan. 16, 2013   (DE) .................. 10 2013 200 578

(51) Int. Cl.
*B02C 25/00* (2006.01)
*B02C 15/00* (2006.01)
*H02P 31/00* (2006.01)

(52) U.S. Cl.
CPC ............ *B02C 25/00* (2013.01); *B02C 15/007* (2013.01); *H02P 31/00* (2013.01)

(58) Field of Classification Search
CPC ........ B02C 25/00; B02C 15/007; H02P 31/00
(Continued)

(56) References Cited

U.S. PATENT DOCUMENTS

2007/0145168 A1* 6/2007 Theberge ............ B02C 17/1805
                                                                    241/30
2009/0308961 A1* 12/2009 Nelson .................... B02C 15/04
                                                                    241/121
(Continued)

FOREIGN PATENT DOCUMENTS

CN    101594940 A    12/2009
DE    102007033256   1/2009
(Continued)

OTHER PUBLICATIONS

International Search Report issued by the European Patent Office in International Application PCT/EP2013/066483.

*Primary Examiner* — Omar Flores Sanchez
(74) *Attorney, Agent, or Firm* — Henry M. Feiereisen LLC (57) ABSTRACT

A method for drive control of a vertical roller mill having a grinding table rotatable about a vertical axis includes driving the grinding table with a drive train comprising an electric motor and a gearbox with a rotation speed; monitoring a profile of a measured value derived from vibration-relevant measured values to detect a predefined pattern in the profile; and when the predefined pattern is detected, automatically increasing or reducing the rotation speed of the grinding table by a predefined adjustment value. A corresponding drive system operating according to the method is also disclosed.

14 Claims, 6 Drawing Sheets

(58) Field of Classification Search
USPC ........................................ 241/27, 36, 230, 30
See application file for complete search history.

(56) References Cited

U.S. PATENT DOCUMENTS

| | | | |
|---|---|---|---|
| 2010/0327094 A1* | 12/2010 | Stone | ...................... B02C 15/04 |
| | | | 241/33 |
| 2012/0111978 A1* | 5/2012 | Murphy | .................. B02C 15/04 |
| | | | 241/25 |
| 2012/0126044 A1* | 5/2012 | Stone | ...................... B02C 15/04 |
| | | | 241/25 |
| 2014/0048634 A1 | 2/2014 | Meinhard | |
| 2017/0225172 A1* | 8/2017 | Nower | ................ B02C 17/1805 |

FOREIGN PATENT DOCUMENTS

| | | |
|---|---|---|
| DE | 102009057732 | 6/2011 |
| DE | 102011018705 A1 | 10/2012 |
| EP | 2295147 | 3/2011 |
| JP | 62-106633 U | 7/1987 |
| JP | 62-286558 A | 12/1987 |
| JP | 5-84447 A | 4/1993 |
| JP | 5-84448 A | 4/1993 |
| JP | 5-104013 A | 4/1993 |
| JP | 2000-126632 A | 5/2000 |
| JP | 2008178833 A | 8/2008 |
| WO | WO2008/049545 | 5/2008 |
| WO | WO2010/015564 | 2/2010 |

\* cited by examiner

DRIVE CONTROL METHOD AND DRIVE SYSTEM OPERATING ACCORDING TO SAID METHOD

CROSS-REFERENCES TO RELATED APPLICATIONS

This application is the U.S. National Stage of International Application No. PCT/EP2013/066483, filed Aug. 6, 2013, which designated the United States and has been published as International Publication No. WO 2014/111176 A1 and which claims the priority of German Patent Application, Serial No. 10 2013 200 578.4, filed Jan. 16, 2013, pursuant to 35 U.S.C. 119(a)-(d).

BACKGROUND OF THE INVENTION

The present invention relates to a drive control method, namely a method for controlling a heavy duty drive, in particular a heavy duty drive for a vertical roller mill for comminuting brittle materials such as cement raw material, and to a corresponding drive system operating according to said method.

Vertical roller mills of the above mentioned type, having a grinding table rotating about the vertical and grinding rollers above the grinding table, are subject to severe mechanical vibrations. The resulting forces and torques can be so powerful that the grinding process has to be stopped in order to prevent damage to the drive train, namely the electric motor and gearbox in particular, or to the plant as a whole.

In order to minimize such vibrations, the mill operator has hitherto had to design the process parameters, i.e. in particular the contact pressure of the grinding rollers, composition of the material to be ground and amounts of grinding additives, such that the vibrations excited remain below a critical level. However, this means undesirable process design limitations which negatively impact many areas. These include the range of products that can be made from the respective ground material obtained, the effectiveness of the mill, the energy input required and the cost-efficiency. Nevertheless, such measures are unreliable, as much experience is required for correct process control and the properties of the natural materials before and after grinding are necessarily always different. This makes it necessary to continuously optimize the process and adapt it to suit the raw material.

However, extreme vibration states—known in the industry as "rumbling" of the mill, repeatedly occur, with the result that the mill has to be stopped and then restarted. This is to the detriment of the availability and productivity of the plant. There is also the risk of gearbox and plant damage. To obviate this problem, process control has hitherto been organized particularly defensively in order to prevent these mill vibrations as far as possible. However, the production rate, product quality and the range of manufacturable products suffer as a result.

Against this background and because of the increasingly exacting requirements in respect of availability, efficiency and Total Cost of Ownership (TCO), the design and arrangement of the electrical and mechanical components of a drive system and of the respective drive train of a heavy duty drive, in particular of a vertical roller mill, are becoming increasingly important.

For vertical roller mills, drive systems comprising a gearbox and an electric motor in the form of an asynchronous motor, preferably a wound rotor, and a frequency converter feeding the electric motor constitute a preferred solution. Here the mill gearboxes are in practice implemented as variants of bevel or spur gear planetary mechanisms. The purpose of the gearing arrangement is not only speed and torque conversion but also to absorb the axial grinding forces and transfer them into the base.

Controlling such a drive system for a vertical roller mill essentially presents the following problems in practice:

In order to be able to ensure optimum process control, the first, apparently trivial task of the drive is to deliver the predefined rotation speed of the grinding table. As the process torque demand at the grinding table fluctuates, speed control is required.

The load fluctuations and vibration excitations acting on the drive mechanism are influenced by impulsive loads such as those produced when the grinding rollers encounter coarse material, stochastic loads of the grinding process, periodic excitations from the gearbox and mill kinematics, and a varying contact pressure of the grinding rollers. The interaction of these load influences results in a complex load cycle which can even set off resonance vibrations.

In addition to the drive train vibrations, an unstable, i.e. fluidizing or undulating grinding bed, for example, can also cause extreme vibrational states of the mill, in particular mill rumbling.

Lastly the grinding of natural products makes it largely unpredictable how the grinding process must be adjusted in order to guarantee quiet running of the mill. It is therefore always a challenge for the operator at the control desk to find the correct process parameters. In the end, although the drive alone can quieten a poorly adjusted process, it cannot correct it.

SUMMARY OF THE INVENTION

The approach proposed here, deals with the effect of undesirable rumbling of a mill and an object of the present invention is accordingly to specify a means of efficiently preventing or at least reducing such rumbling.

Vibration sensors mounted on the mill and possibly used to bring about emergency stopping of the mill have hitherto been used to detect rumbling in a vertical roller mill. However, experience has shown that such vibration sensors only operate with a certain time lag in response to an increase in the torque amplitudes in the drive. By that time, damaging load torques may have come into play, possibly endangering the gearbox. On the other hand, compensating for torque fluctuations does not necessarily also eliminate their cause, such as grinding bed undulation, for example.

The above mentioned object is achieved by a method for drive control of a vertical roller mill having the features as claimed in claim 1. The object is also achieved by a drive system having the features of the parallel device claim. The vertical roller mill, also referred to here and in the following sometimes merely as the mill for short, comprises a grinding table rotating about the vertical which can be driven by means of a drive train comprising at least one electric motor and a gearbox and is driven during operation of the mill. The method defined in claim 1 is characterized in that a measured value characteristic or measured value profile resulting from acquired vibration-relevant measurements is monitored for the occurrence of a predefined pattern in the measured value characteristic and that, in the event of a pattern being recognized in the measured value characteristic, the rotation speed of the grinding table is automatically increased or reduced by a predefined or predefinable adjustment value.

Vibration-relevant measured values are all the measured values obtained or obtainable in respect of the mill, the evaluation of which indicates mechanical vibrations of the mill, in particular such mechanical vibrations as are termed rumbling. Possible means of acquiring such vibration-relevant measured values include sensors in the form of vibration monitors, vibration sensors or the like which are e.g. mounted on the mill framework or other parts of the mill structure. Alternatively or additionally possible are also sensors which are assigned to the drive train where they acquire vibration-relevant measured values. For example, it can be provided that the power draw of an electric motor is measured by means of such a sensor and vibration-relevant data is derived from an electric motor power draw correlated with varying load situations, so that in this respect measured values relating to motor current drawn during operation of the mill in each case are also an example of vibration-relevant measured values.

The abovementioned adjustment value can be a fraction of the instantaneous rotation speed of the grinding table, in particular of the instantaneous setpoint rotation speed, so that in the event of a pattern being detected in the measured value characteristic, the rotation speed of the grinding table is automatically reduced by e.g. 5%. The increase or reduction in the rotation speed of the grinding table self-evidently does not occur abruptly but continuously because of the inertia of the involved masses. The increase or reduction in the grinding table rotation speed due to a detected pattern is therefore also related to an underlying increase or reduction in a setpoint rotation speed for the grinding table and, in turn underlying this, to a setpoint speed for the drive and its electric motor. The difference between the instantaneous grinding table rotation speed and the minimum grinding table rotation speed can be used as the adjustment value. Then the setpoint speed is significantly reduced abruptly and the actual speed falls continuously.

In the case of a drive system designed to carry out such a method and possibly individual or a plurality of the embodiments described below, namely a drive system for a vertical roller mill having a grinding table rotating about the vertical, said drive system comprises an electric motor, a frequency converter feeding the electric motor and a gearbox between the electric motor and the grinding table. The drive system is characterized by a pattern recognition device, wherein a predefined or predefinable pattern in a measured value characteristic resulting from acquired vibration-relevant measured values can be identified by means of the pattern recognition device so that, in the event of a pattern being detected, a rotation speed of the grinding table of the vertical roller mill can be automatically increased or reduced by a predefined or predefinable adjustment value.

In short, the invention is therefore a method and a device for drive control of a heavy duty arrangement in the form of a drive system in which, if an undesirable vibration state is detected or anticipated, namely in the context of recognizing a pattern in the measured values considered (pattern recognition), the vibrations of the heavy duty arrangement can be prevented, eliminated or at least reduced by increasing or reducing (varying) the speed of the vibrations of the heavy duty arrangement. Whether the undesirable vibration states, particularly rumbling, can be prevented, eliminated or "only" reduced using the approach described here depends on the type of pattern considered. In the case of a very conservatively selected pattern, an increase in a dynamic of the measured value characteristic, for example, can already be detected. If the speed is increased or reduced on account of a detected pattern as early as that stage, it may be possible to prevent the rumbling even before it develops. If the pattern is selected such that it can only be expected to occur in the measured value characteristic if rumbling has already developed, the rumbling can be eliminated or at least reduced by increasing or reducing the speed in response to a detected pattern. In the following, preventing, eliminating or reducing of the vibrations will be collectively referred to as prevention for short.

The advantage of the invention is that, by varying the rotation speed of the grinding table, mill rumbling can be prevented without having to stop the grinding process, and that this result is achieved by comparatively simple intervention in the overall system, namely by controlling the electric motor.

For the rest, the rotating grinding table is only part of the mill conceivable as a vibration system. It is also alternatively or additionally possible—assuming that mill operation is not to be interrupted—for vibration system parameters other than the grinding table rotation speed to be influenced. For example, the material being ground on the grinding table is also part of the vibration system, so that by injecting water into the material being ground the properties thereof can be influenced. Alternatively or additionally, the grinding roller pressure can be influenced, as the grinding rollers are likewise part of the vibration system. Such influencing of the vibration system can also take place depending a pattern detected in the measured value characteristic.

Advantageous embodiments of the invention are set forth in the dependent claims. Back-references used in the dependent claims relate to further refinements of the subject matter of the main claim by virtue of the features of the particular dependent claim. They are not to be understood as a waiver of the right to independent, objective protection for the combination of features of the dependent claims to which they refer. In addition, having regard to an interpretation of the claims in the case of a more detailed concretization of a feature in a dependent claim, it is to be assumed that such a restriction does not exist in the respective preceding claims. Lastly it is pointed out that the method specified here can also be further developed according to the dependent device claims and vice versa.

If the electric motor is fed by a frequency converter, the rotation speed of the grinding table can be increased or reduced by the adjustment value by appropriately controlling the frequency converter. An alternative to a frequency converter is a superposition gear with which the above described varying of the rotation speed of the grinding table can be achieved in an essentially equivalent manner.

In one embodiment of the method, torque or speed measurements are used as vibration-relevant measured values and are acquired. The further description of the approach proposed here will be based, without loss of generality, on such torque or speed measurements. These will now be subsumed under the term measured values and a resulting torque or speed measured value characteristic is accordingly subsumed under the term measured value characteristic. To obtain such a measured value characteristic and the underlying measured values, a sensor system, i.e. at least one sensor incorporated in the sensor system or belonging to the sensor system, is used to measure a rotation speed of a rotating component of the drive train and/or at least one driving and/or supporting torque acting on the gearbox.

A corresponding embodiment of the drive system outlined above is characterized by such a sensor system for obtaining a vibration-relevant measured value in the form of a torque or speed measurement, wherein by means of the sensor system a rotation speed of a rotating component of the vertical roller mill and/or at least one driving and/or supporting torque acting in or on the gearbox can be measured and is measured during operation.

In this connection it should be noted that the use of sensors, e.g. sensors for acquiring torque or speed measurements in the drive train (drive sensor system) instead of vibration sensors on the mill structure has apparently not been taken into consideration hitherto. However, according to the inventor's insight, mechanical vibration of the mill and therefore also rumbling of the mill can also be detected using such measurements. It is actually even the case that such measured values indicate respective process events even more directly, as the events in the grinding mechanism become much more clearly apparent, according to the inventor's insight, in the degree of rotational freedom of the drive than in the vibration level of the mill structure as a whole. This is because the rumbling is a periodic collapse of the supporting effect of the grinding bed on the grinding rollers. Associated with the loss of this supporting effect, e.g. because of undulation of the grinding bed or yielding aside of a fluidized material to be ground, there also arises a breakdown of the loading torque exerted by the grinding bed on the grinding table and therefore directly on the drive train. This torque characteristic is directly detectable in said measured values, namely even before the grinding rollers move so strongly that the vibration also perceptibly spreads to the rest of the mill structure. Undesirable states such as mill rumbling can be detected earlier and more precisely in this way. Comparative studies have shown that detection of mill rumbling via vibration sensors usually takes place after a few seconds at the earliest. In this time the drive is subject to just over a hundred load cycles (at a rumble frequency of e.g. 15 Hz). Evaluation of the drive sensor system allows rumbling to be identified after just three to ten load cycles, i.e. in less than one second. The advantage of using a sensor system of this kind and of the thereby obtained measurements is therefore that, because mill rumbling can be detected earlier, countermeasures, i.e. even emergency shutdown of the drive ("emergency stop"), for example, but self-evidently also the automatic increasing or reducing of the rotation speed of the grinding table by the predefined or predefinable correction value as highlighted here, can be initiated earlier and therefore the stressing of the drive, but also of the mill as a whole, due to mill rumbling can be reduced.

The single or repeated exceedance of a predefined or predefinable threshold value in the measured value characteristic can be used as the monitored pattern. Therefore, if a single or repeated exceedance of a respective threshold value is detected (by means of the pattern recognition device), the pattern is deemed to be recognized and speed adjustment is initiated in order to prevent rumbling, or possibly an emergency stop is triggered. On the one hand a threshold value relating to the instantaneous values of the measured value monitored, but also a threshold value relating to a time change of the measured value characteristic, i.e. in respect of a local rate of increase of the measured values, for example, can be used as the monitored threshold value.

The pattern recognition device can be implemented in software and/or hardware and comprises at least one comparator for monitoring the exceedance of the threshold value and—if the monitored pattern requires repeated exceedance of the threshold value—a counter in order to record the number of threshold value exceedances. The pattern recognition device generates an output signal which initiates the speed adjustment or the drive shutdown process (emergency stop).

In one embodiment of this variant of the method, the repeated exceedance of the threshold value during a predefined or predefinable time period is used as the monitored pattern. If repeated exceedance of the threshold value is therefore identified within the respective time period, the pattern is deemed to be recognized and speed adjustment or the shutdown process (emergency stop) is initiated. The pattern recognition device then additionally comprises a timer which is started e.g. the first time the threshold value is exceeded and which, when it times out, resets a counter for counting the number of threshold value exceedances. The pattern recognition device generates an output signal if the counter reaches a value corresponding to the respective pattern within the time period. If the counter does not reach this value, the counter is reset by the timer on reaching the end of the time period and no output signal is generated.

In an additional or alternative embodiment of the invention, the single or repeated exceedance of the threshold value at a predefined or predefinable rate is used as the monitored pattern. The slope of the measured value characteristic is therefore additionally taken into consideration and the exceedance of the threshold value is then only taken into account in the context of pattern recognition if the exceedance takes place with a slope of the measured value characteristic determined by the rate. This variant of the method can also employ a first and a lower second threshold value so that an exceedance of the second threshold value is only taken into consideration for pattern recognition purposes if it is exceeded at a particular rate/slope in the measured value characteristic and each exceedance of the first threshold value is taken into account as part of pattern recognition.

The patterns described hitherto and their recognition (single or repeated threshold value exceedance; repeated threshold value exceedance within a particular time period; single or repeated threshold value exceedance at a particular rate) can also be combined so that, for example, repeated threshold value exceedance at a particular rate within a particular time period can be used as the pattern.

An alternative or additional possibility is for an exceedance of a predefined or predefinable threshold value in a plot of the torque or speed measured value characteristic in a frequency range to be used as the monitored pattern. Once again the pattern and its recognition, as explained above, can be extended so that the pattern requires, for example, repeated exceedance of the threshold value, repeated exceedance of the threshold value within a determined time period and/or repeated exceedance of the threshold value at a particular rate or the exceedance of the threshold value for a particular duration.

In one embodiment of the method, pattern recognition is carried out continuously. Each time a monitored pattern in the measured value characteristic is identified, the setpoint rotation speed of the grinding table is automatically and temporarily increased or reduced by the adjustment value.

If the difference between the instantaneous speed or instantaneous setpoint speed and a minimum speed is used as the adjustment value, the setpoint speed abruptly falls significantly and the actual speed follows continuously because of the inertia of the moved masses. As soon as the monitored pattern is no longer detected as the result of continuously performing pattern recognition with continuous lowering of the actual speed, the setpoint speed is reset again to the original value. The setpoint speed increases correspondingly abruptly and the actual speed follows the setpoint speed continuously. If the pattern is detected in the measured value characteristic up to attainment of the setpoint speed or after attainment of the setpoint speed, the setpoint speed is again reduced by the adjustment value and reset again to the original setpoint value on the disappearance of the pattern from the measured value characteristic, and so on.

Alternatively, a fraction of the instantaneous setpoint speed or of the instantaneous speed, for example, is used as the adjustment value. If, for example, a reduction in the rotation speed of the grinding table in the event of a pattern being recognized is then provided, the speed is reduced by such an adjustment value, e.g. 5% of the setpoint speed, the first time the pattern is recognized and is further reduced by the adjustment value each time a pattern is recognized subsequently. The rotation speed of the grinding table therefore reduces continuously for as long as the vibration-critical situation lasts and corresponding patterns in the measured value characteristic in question are being recognized. If no pattern is detected during a predefined or predefinable time period and the grinding table rotation speed remains below or above the originally predefined setpoint value because of a preceding speed variation, the speed can be continuously returned to the original setpoint value. Alternatively, it is also possible for the speed to be discretely returned to the original setpoint value. Then each time no pattern of the type described above is detected within a predefined or predefinable time period, the previously performed speed adjustment is partially reversed, namely to the extent of the adjustment value, until eventually the original setpoint speed is attained again.

The method and the drive system operating according to said method are based on the functionality of the pattern recognition device. Individual aspects of the functionality of the pattern recognition device have already been described above, namely a comparator for threshold value monitoring, an optional counter for recording the number of exceedances of the threshold value and an optional timer for monitoring the number of threshold value exceedances within a defined time period. The functionality of the pattern recognition device, the acquisition and processing of the measured values considered functionally preceding pattern recognition as well as the resolution of the speed adjustment or possibly of the emergency stop functionally following pattern recognition can be realized in hardware and/or software. In the case of software implementation the invention is also a computer program having program code means for carrying out all the steps of the method described here and in the following when the computer program is run on a controller or the like for a drive system for a vertical roller mill. In addition, the invention is therefore a digital storage medium having electronically readable control signals which can interact with a programmable controller for a drive system for a vertical roller mill such that such a method is executed. Lastly, the invention is also a drive system of the above mentioned type which has a processing unit and a memory, wherein such a computer program is loaded into the memory and is executed during operation of the drive system by the processing unit thereof.

BRIEF DESCRIPTION OF THE DRAWING

An exemplary embodiment of the invention will now be explained in greater detail with reference to the accompanying drawings. Equivalent items or elements are provided with the same reference characters in the figures.

It should also be pointed out that the approach described here and individual and possibly combined embodiments can also be combined with the approach proposed and specific embodiments described in the concurrently filed US patent applications by the same inventor and having the attorney docket numbers Kube-3 (official application number not yet known). In this respect, the complete disclosure content of these parallel applications, especially having regard to the therein described periodic varying of the grinding table rotation speed which is also termed "shuttling", is incorporated in the present specification by reference.

The exemplary embodiment should not be interpreted as a limitation of the invention. On the contrary, within the scope of the present disclosure, changes and modifications are possible, especially such modifications and combinations that, for example, as a result of combinations or modifications of individual features or elements or method steps described in connection with the general description and the descriptions of various embodiments, and contained in the claims and illustrated in the drawings, can be comprehended by persons skilled in the art as far as the achievement of the object is concerned and, as a result of combinable features, lead to a novel device or to novel method steps and/or sequences of method steps.

FIG. 4 and

DETAILED DESCRIPTION OF PREFERRED EMBODIMENTS

Figure 1:
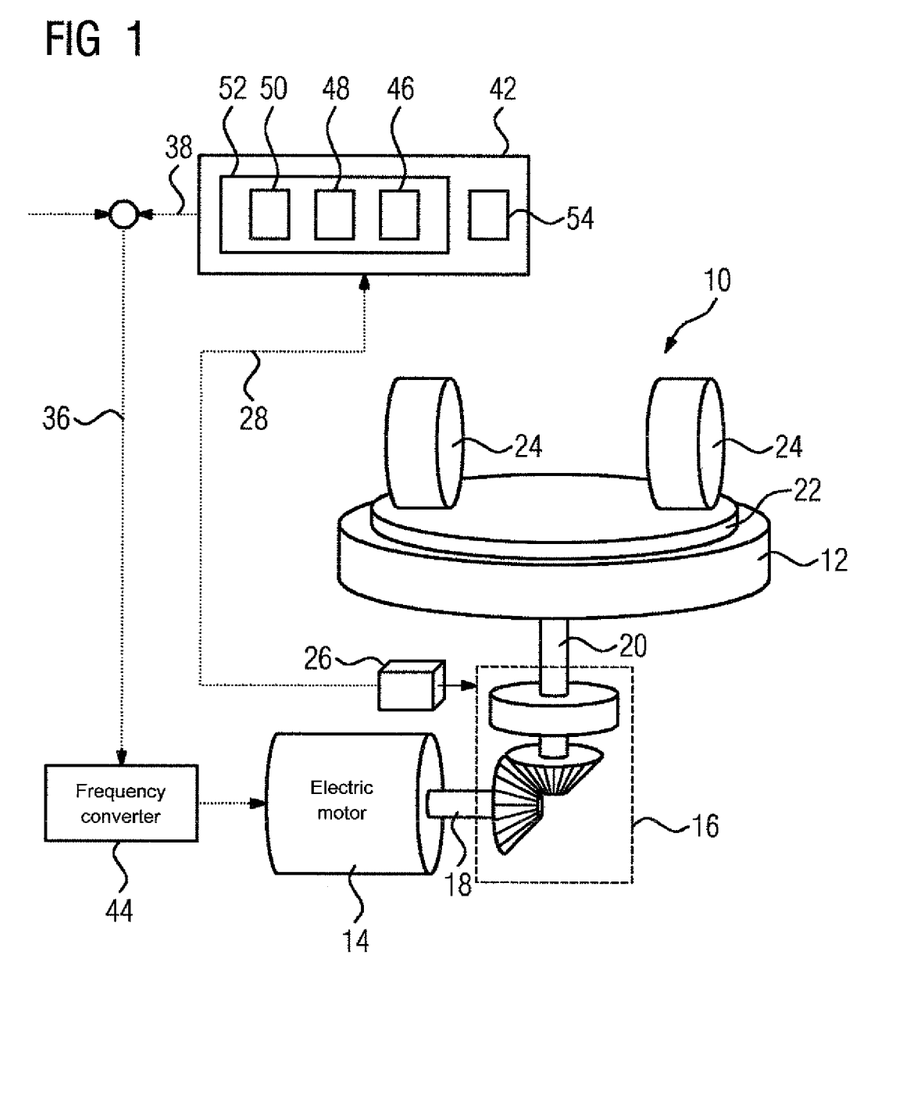
FIG. 1 shows a greatly simplified schematic representation of a vertical roller mill comprising a grinding table driven by means of a heavy duty drive.

FIG. 1 shows a greatly simplified schematic representation of a vertical roller mill 10 for comminuting brittle materials, e.g. cement raw material. The vertical roller mill 10 comprises a grinding table 12 rotatable about the vertical. The grinding table 12 is driven by means of a heavy duty drive in the form of a motor, in particular an electric motor 14, and, in the example shown here, by means of a gearbox 16 located between electric motor 14 and grinding table 12. The gearbox 16 is shown here, without loss of further generality, as bevel-gear teeth with following planetary gearing not shown in greater detail. The gearbox 16 can also comprise spur-gear teeth or the like and/or a preceding or following planetary gearing or the like.

The vertical roller mill 10 comprises at least one driven shaft. In the illustration in FIG. 1, the vertical roller mill 10 comprises a motor shaft 18 and a grinding table shaft 20. All the means for transmitting the driving force of the electric motor 14 to the grinding table 12 are termed the drive train. Here the drive train comprises at least the electric motor 14, the motor shaft 18, the gearbox 16 and the grinding table shaft 20.

The vertical roller mill 10 as a whole is a resonant system. During operation of the vertical roller mill 10, the electric motor 14 causes the grinding table 12 to rotate. On the grinding table 12 there is, as a result of the grinding process and as a result of supplied material to be ground, a grinding bed 22, i.e. a mixture of ground material and material to be ground. The grinding effect is achieved by a grinding roller 24 or a plurality of grinding rollers 24 pressing onto the grinding bed 22 and the rotating grinding table 12 because of their weight on the one hand, but on the other hand in some cases also because of additionally applied forces which are applied e.g. by means of a hydraulic ram or the like engaging with a swivel-mounted grinding roller 24.

Figure 2:
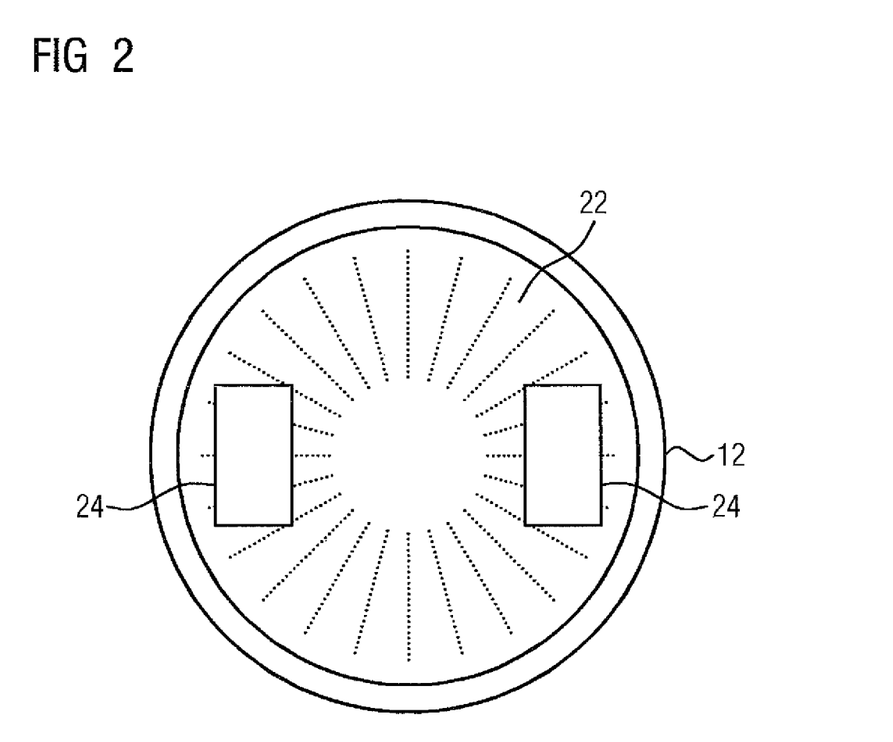
FIG. 2 shows a plan view onto the grinding table and grinding bed.

FIG. 2 shows a simplified schematic plan view of the grinding table 12 with the grinding bed 22 and the (in this case) two grinding rollers 24. The radial dotted lines within the grinding bed 22 are to indicate undulation of the grinding bed 22 that frequently arises during the grinding process. Such undulation of the grinding bed 22 is one of several possible causes of the mill rumbling that is to be prevented using the approach presented here, and a cause of mill rumbling that is particularly easy to represent graphically. If the grinding bed 22 is undulating, it is easy to see that the in particular swivel-mounted grinding rollers 24 moving relative to the grinding bed surface follow the surface of the grinding bed 22 and the thereby caused upward and downward movement of the grinding rollers 24 is transmitted to the mill 10 in the form of vibrations. Another cause of mill rumbling, and even more powerful vibrations in the form of upward and downward movement of the grinding rollers 24, that cannot be represented graphically is a fluidizing grinding bed 22 and a resulting periodic breakdown of the supporting effect of the grinding bed 22. The grinding rollers 24 then sink locally into the grinding bed 22 and, because of their intrinsic rotation and the rotation of the grinding table 12, return to the surface elsewhere on the grinding bed 22 in order then to possibly break into it again, and so on. Another likewise difficult-to-represent cause of mill rumbling are powerful torsion vibrations in the drive train. If a natural frequency of the mill 10 is excited in this way, resonance can even be set up.

Such vibrations have hitherto been detected by means of a sensor system disposed on the mill framework (vibration sensor; not shown). As soon a vibration measurement acquired by the sensor system exceeds a limit value, the electric motor 14 is stopped and the mill 10 is subsequently restarted.

Here it is proposed that vibration-relevant measured values 28 such as torque or speed measurements, for example, are acquired by means of a sensor system 26 (FIG. 1) assigned in particular to the drive train, i.e. in particular the electric motor 14, motor shaft 18, gearbox 16 or grinding table shaft 20, or to the grinding table 12. The torque measurements acquired are a measure of the torque or gearbox torque transmitted by means of the gearbox 16, i.e. a measure of a torque which is termed the mechanically effective torque in the drive train, in particular in the gearbox 16, to differentiate it from an electrical torque acting on the electric motor 14.

Figure 3:
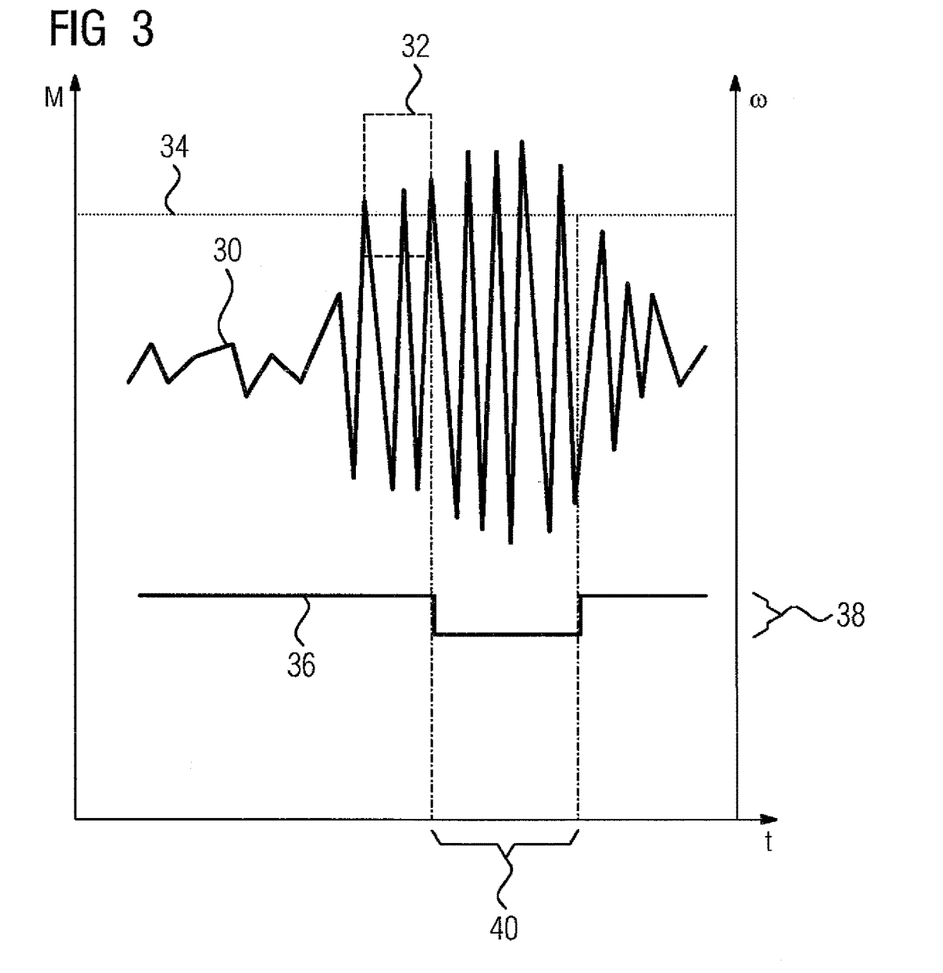
FIG. 3 shows a measured value characteristic obtained in respect of the vertical roller mill and a heavy duty drive speed adjustment resulting from monitoring of the measured value characteristic.

On the basis of a plurality of measured values 28 acquired by means of the sensor system 26, e.g. based on a plurality of torque measurements, a measured value characteristic 30 (FIG. 3) is produced, namely a torque measurement characteristic, and in this respect the left-hand coordinate axis is denoted by the symbol M in the illustration in FIG. 3. This measured value characteristic 30 is monitored for the occurrence of a predefined or predefinable pattern 32 (FIG. 3). Shown here as a pattern 32 by way of example is the repeated exceedance, here on three occasions, of a predefined or variably predefinable threshold value 34 (torque threshold value). In the event of a pattern 32 being recognized in the measured value characteristic 30, the rotation speed of the grinding table 12, i.e. the causally related speed of the electric motor 14, is automatically increased or reduced by a predefined or predefinable adjustment value 38. To this end the diagram in FIG. 3 also shows in the same coordinate system above the coordinate axis marked on the right and denoted by the symbol w, the characteristic of a setpoint speed 36 of the electric motor 14. Here it is shown that in response to a recognized pattern 32 (repeated exceedance of the threshold value 34) in the measured value characteristic 30, the setpoint speed 36 of the electric motor 14 is reduced by the adjustment value 38. In that a measured value characteristic 30 resulting from the drive applied to the grinding table 12 is responded to in this way by indirect or direct adjustment of the rotation speed of the grinding table 12, this is a method for drive control of the mill 10.

If the respective pattern 32 in the measured value characteristic 30 is recognized, this means that the state of the rumbling mill 10 is therefore also detected. In the representation in FIG. 3, the time span of the rumbling 40 is marked as the region between the last threshold value exceedance associated with the pattern 32 and a subsequent lengthy exceedance of the threshold value 34.

When the rumbling 40 has died away due to the speed adjustment, the setpoint speed 36 can be returned to its original value (not shown). Likewise not shown is the fact that in a particular embodiment of the method proposed here for long-lasting rumbling 40, i.e. for a subsequent repeated occurrence of the pattern 32 in the measured value characteristic 30 even in the case of an already adjusted speed, the setpoint speed 36 of the electric motor 14 is increased or reduced again by the adjustment value 38.

This takes place until such time as the rumbling 40 dies away. The adjustment of the setpoint speed 36 of the electric motor 14 is an indirect adjustment of the rotation speed of the grinding table 12. Mill vibrations or rumbling resulting from undulations in the grinding bed 22, for example, do not even arise in the first place, decay or are at least reduced if the speed is varied in this way.

In this respect it must be noted that any impending rumbling can also be detected using the approach proposed here. When detected rumbling is referred to here, this does not therefore also include a detected risk of possibly impending rumbling. Using the approach proposed here, rumbling of the mill 10 can be prevented, eliminated or at least reduced. Prevention means that a risk of potential rumbling is anticipated and rumbling is prevented from arising in the first place by adjusting the speed. Elimination means that rumbling identified by pattern recognition dies away completely again due to the speed adjustment. Reduction means that rumbling identified by pattern recognition is at least reduced by adjusting the speed.

The above statements apply correspondingly to measured values acquired using the sensor system 26 or at least one sensor incorporated in such a sensor system 26 and to a corresponding speed measurement curve.

Not shown in FIG. 3 is the fact that a number of threshold value exceedances within a particular time period and/or a rate of rise of the measured value characteristic during the threshold exceedance can be taken into account for pattern recognition.

Figure 4:
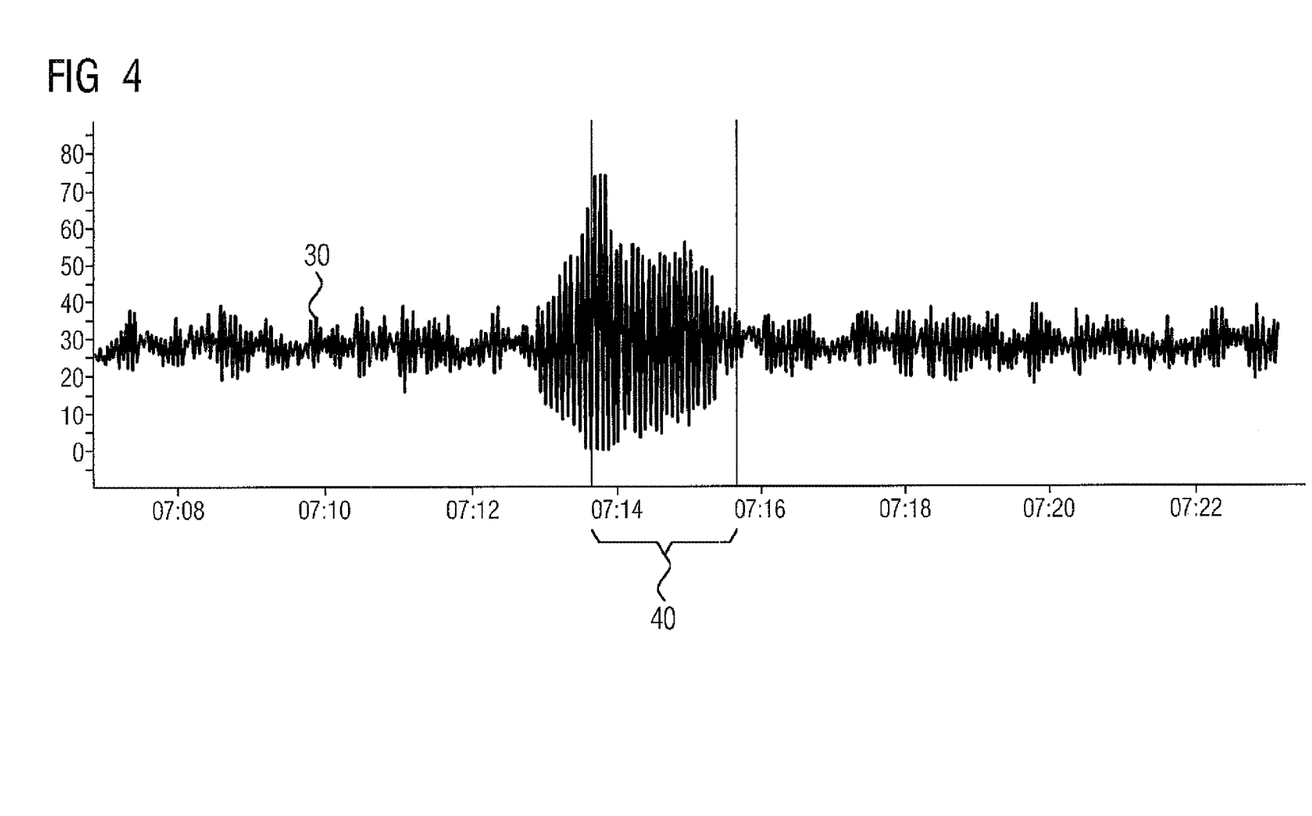
Figure 5:
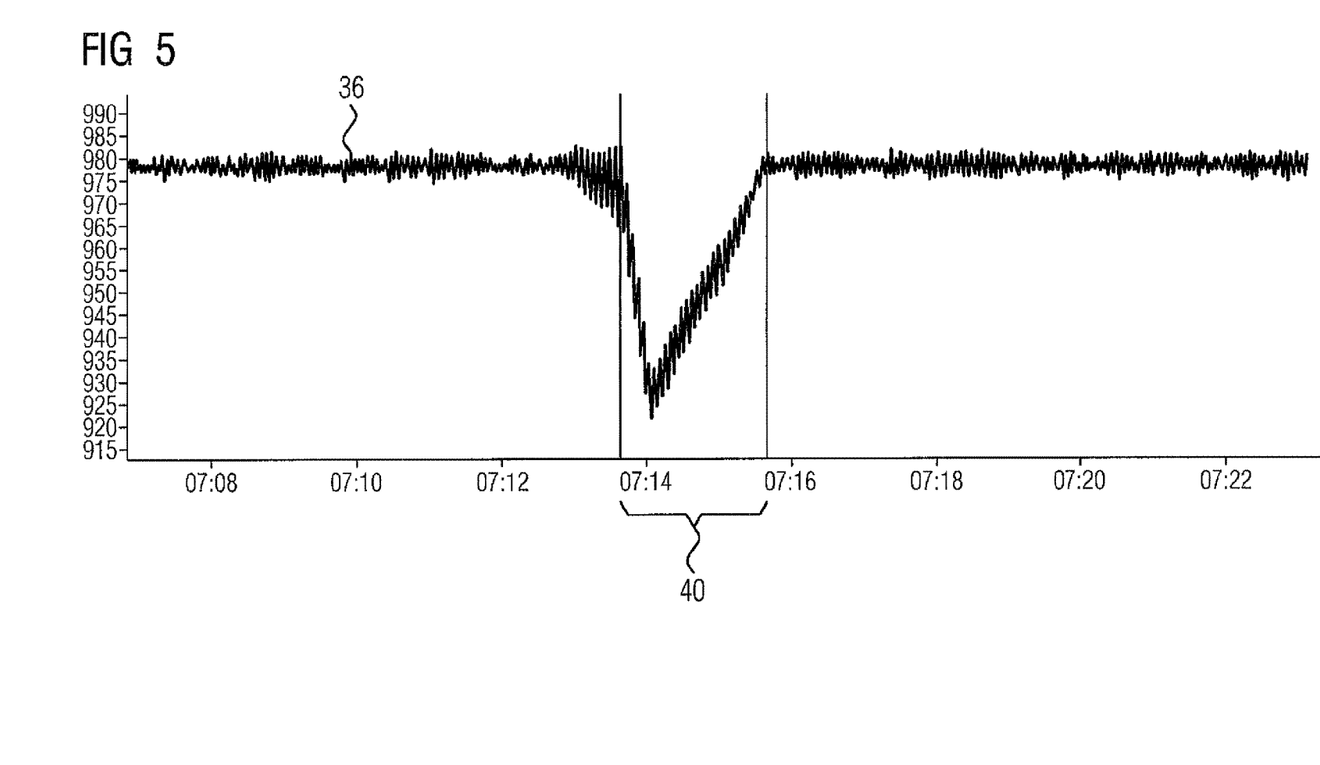
FIG. 5 show measured values actually acquired in the context of a test situation for a torque acting in or on the gearbox or for a rotation speed of the grinding table.

The illustrations in FIGS. 4 and 5 (the abscissae show the time in the unit [minutes:seconds]) show real measured value characteristics 30 obtained in a test situation, namely a characteristic curve of a measured value 28 for the torque acting in or on the gearbox 16 (measured value characteristic 30) and a resulting rotation speed of the grinding table 12. Clearly visible is the strong fluctuation of the torque approximately in the center of the detection range. These strong fluctuations are identified after some time (pattern recognition) as rumbling 40, for example, because the threshold value 34 has been exceeded once or repeatedly. Then (see FIG. 5 which shows the corresponding characteristic of the rotation speed of the grinding table 12 on the same time base) the speed of the grinding table 12 is automatically reduced, e.g. by using the difference between the instantaneous setpoint speed or instantaneous speed and a minimum speed as the adjustment value 38 and reducing the setpoint speed by the adjustment value 38 (the minimum speed is then used as the setpoint speed). In the illustration in FIG. 5, the reduction in the speed still strongly fluctuating due to the rumbling can be detected. As soon as the monitored pattern 32 in the measured value characteristic 30 is no longer detected, the setpoint rotation speed of the grinding table 12 is reset to the original value. In the illustration in FIG. 5, the rise of the actual speed is detected in this respect. Lastly, the original speed is attained again. Even when the original speed is attained, the dynamics of the measured value characteristic 30 are lower than was the case during the detected rumbling 40. The detected rumbling 40 has therefore been eliminated.

Pattern recognition is performed by a pattern recognition device 42 (FIG. 1) and, if it detects a pattern 32, the pattern recognition device 42 outputs an adjustment value 38 for increasing or reducing the speed of the electric motor 14. The setpoint speed 36 currently provided for operating the electric motor 14 is changed on the basis of the adjustment value 38. This is fed to a frequency converter 44 connected upstream of the electric motor 14 in per se known manner, which frequency converter generates a respective supply voltage, in particular AC voltage, on the basis of the setpoint speed 36 for driving the electric motor 14. A superposition gear can also be used instead of a frequency converter 48 or in addition to a frequency converter 48.

The pattern recognition device 42 comprises at least one comparator 46 realized in software or hardware for monitoring the exceedance of a threshold value 34 in the measured value characteristic 30 and an optional counter 48 likewise realized in software or hardware for counting the number of threshold value exceedances, and a likewise optional timer 50 implemented in software or hardware for detecting whether a particular number of threshold value exceedances has occurred over a period of time implemented by means of the timer 50.

If pattern recognition is realized in software, the comparator 46 and possibly the counter 48 as well as the timer are functionalities of a computer program 52 designed for pattern recognition, which computer program is loaded into a memory (not shown separately) of the pattern recognition device 42 and is executed during operation by a processing unit 54 in the form of or in the manner of a microprocessor.

Figure 6:
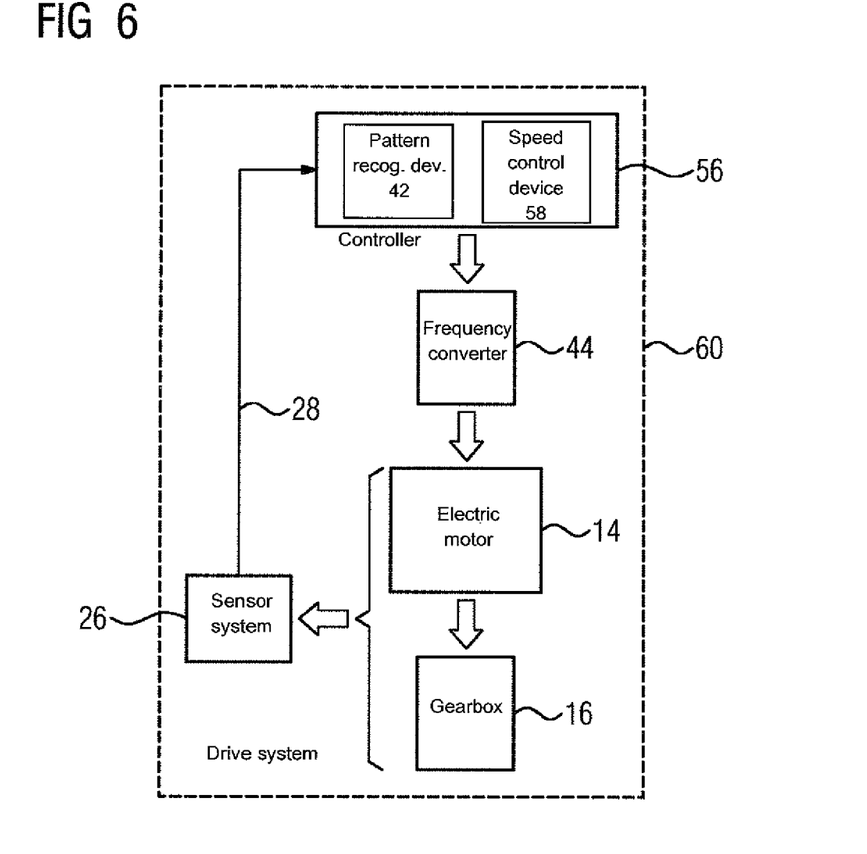
FIG. 6 shows a drive system of the vertical roller mill incorporating a controller which in turn comprises a pattern recognition device or a software implementation of a pattern recognition device for evaluating a measured value characteristic of the type shown in FIG. 3.

The representation in FIG. 6 lastly shows in schematically simplified form that the pattern detection device 42 is e.g. a sub-functionality of a controller 56 or the like, i.e. a control device for controlling the frequency converter 44. In addition to the pattern recognition device 42 or a software implementation of the pattern recognition device 42, the controller 56 can also comprise other functional units such as e.g. a closed-loop control device 58 for controlling the speed of the electric motor 14 or similar. The controller 56, the frequency converter 44 and the electric motor 14 together constitute a drive system 60 for operating the mill 10.

Although the invention has been illustrated and described in detail by an exemplary embodiment, the invention is not limited by the example(s) disclosed and other variations may be inferred therefrom by the average person skilled in the art without departing from the scope of protection sought to the invention.

Individual prominent aspects of the description submitted here may be summarized as follows: specified are a method for drive control of a vertical roller mill 10 having a grinding table 12 rotatable about the vertical, wherein the grinding table 12 can be driven by a drive train comprising an electric motor 14 and a gearbox 16, wherein a measured value characteristic 30 resulting from the acquired torque and speed measurements 28 is monitored for the occurrence of a predefine pattern 32 and wherein, in the event of a pattern 32 being identified in the measured value characteristic 30, the rotation speed of the grinding table 12 is automatically and normally only temporarily increased or reduced by a predefined or predefinable adjustment value 38 in order to prevent rumbling of the mill 10, and a drive system 60 operating according to said method.

The differentiation between the approach described here and the shuttling described in the parallel application may be made clear by a numerical example to illustrate the basic orders of magnitude: shuttle mode is characterized by a gentle variation rate of e.g. 4*1% in 10 s (=0.4%/s) at a deviation from the average speed of e.g. 1%. In the case of the approach described in this document, it can definitely be assumed that the speed collapses by e.g. 6% in 0.5 s (=12%/s). This abrupt variation highlights the disruptive character of the action, as the mill rumbling detected on the basis of the pattern monitoring, i.e. already existing, can only be disrupted so that it dies away or is interrupted with a degree of probability.

What is claimed is:

1. A method for drive control of a vertical roller mill having a grinding table rotatable about a vertical axis, comprising:
   driving the grinding table with a drive train comprising an electric motor and a gearbox with a rotation speed;
   monitoring a measured value profile of derived from measured values to detect a predefined pattern in the measured value profile; and
   when the predefined pattern is detected, automatically increasing or reducing the rotation speed of the grinding table by a predefined adjustment value.

2. The method of claim 1, wherein the electric motor is fed by a frequency converter, and wherein the rotation speed of the grinding table is increased or reduced by the adjustment value by suitably controlling the frequency converter.

3. The method of claim 1, wherein the measured values comprise torque values represented by at least one driving torque or supporting torque measured in or on the gearbox, or wherein the measured values comprise measured rotation speed values comprise a rotation speed of a rotating component of the drive train.

4. The method of claim 3, wherein the predefined pattern in the measured value profile indicates when a predefined threshold value in the torque values or in the rotation speed values is exceeded at least once or repeatedly.

5. The method of claim 3, wherein the predefined pattern in the measured value profile indicates when a predefined threshold value in the torque values or in the rotation speed values is exceeded at least once or repeatedly over a predefined time period.

6. The method of claim 3, wherein the predefined pattern in the measured value profile indicates when a predefined threshold value in the torque values or in the rotation speed values is exceeded at least once or repeatedly at a predefined rate.

7. The method of claim 3, wherein the predefined pattern in the measured value profile indicates when a predefined threshold value in the torque values or in the rotation speed values is exceeded in a diagram of the torque values or the rotation speed values plotted over a frequency range.

8. The method of claim 1, wherein the measured value profile is monitored continuously, and wherein the automatic increase or reduction in the rotation speed of the grinding table is reversed when the predefined pattern is no longer detected in the monitored measured value profile.

9. The method of claim 1, wherein the measured value profile is monitored continuously, and wherein the rotation speed of the grinding table is automatically increased or reduced by the predefined adjustment value each time the predefined pattern is detected in the monitored measured value profile.

10. A drive system for a vertical roller mill having a grinding table rotatable about a vertical axis, the drive system comprising:
   an electric motor driving the grinding table,
   a frequency converter feeding the electric motor,
   a gearbox arranged between the electric motor and the grinding table, and
   a controller controlling the frequency converter and comprising a pattern recognition device, wherein the pattern recognition device is configured to monitor a measured value profile derived from measured values to detect a predefined pattern in the measured value profile, and wherein the controller is configured to automatically increase or reduce the rotation speed of the grinding table by a predefined adjustment value when the predefined pattern is detected.

11. The drive system of claim 10, further comprising a sensor system operatively connected to a drive train composed of the electric motor and the gearbox, and configured to measure as the measured values torque values represented by at least one driving torque or supporting torque measured in or on the gearbox, or a rotation speed of a rotating component of the drive train.

12. A computer program having program code embodied on a non-transitory storage medium and configured to cause a controller of a drive system for a vertical roller mill having a grinding table and a drive train comprising an electric motor and a gearbox, when loaded into a memory of the controller and executed by the controller, to
   drive the grinding table with a rotation speed;
   monitor a measured value profile derived from measured values to detect a predefined pattern in the measured value profile; and
   when the predefined pattern is detected, automatically increase or reduce the rotation speed of the grinding table by a predefined adjustment value.

13. A non-transitory digital storage medium having computer-readable program code which, when loaded into a memory of a programmable controller for a drive system for a vertical roller mill having a grinding table and a drive train comprising an electric motor and a gearbox and executed by the controller, causes the controller to
   drive the grinding table with a rotation speed;
   monitor a measured value profile derived from measured values to detect a predefined pattern in the measured value profile; and
   when the predefined pattern is detected, automatically increase or reduce the rotation speed of the grinding table by a predefined adjustment value.

14. A controller of a drive system of a vertical roller mill having a grinding table and a drive train comprising an electric motor and a gearbox, the controller comprising:
   a processing unit configured to execute program code which, when loaded into a memory of the processing unit and executed by the processing unit, causes the controller to
   drive the grinding table with a rotation speed;
   monitor a measured value profile derived from measured values to detect a predefined pattern in the measured value profile; and
   when the predefined pattern is detected, automatically increase or reduce the rotation speed of the grinding table by a predefined adjustment value.

* * * * *